(12) United States Patent
Wu et al.

(10) Patent No.: US 8,737,753 B2
(45) Date of Patent: May 27, 2014

(54) IMAGE RESTORATION BY VECTOR QUANTIZATION UTILIZING VISUAL PATTERNS

(71) Applicant: Microsoft Corporation, Redmond, WA (US)

(72) Inventors: Feng Wu, Beijing (CN); Xiaoyan Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/746,174

(22) Filed: Jan. 21, 2013

(65) Prior Publication Data

US 2013/0129197 A1 May 23, 2013

Related U.S. Application Data

(62) Division of application No. 12/194,552, filed on Aug. 20, 2008, now Pat. No. 8,385,670.

(51) Int. Cl.
*G06K 9/00* (2006.01)

(52) U.S. Cl.
USPC .... 382/253; 375/240.22; 704/222; 704/256.8

(58) Field of Classification Search
USPC ............ 382/253; 375/240.22; 704/222, 256.8
See application file for complete search history.

(56) References Cited

U.S. PATENT DOCUMENTS

| | | | |
|---|---|---|---|
| 4,910,608 A | 3/1990 | Whiteman et al. | |
| 5,247,357 A | 9/1993 | Israelson | |
| 5,282,255 A | 1/1994 | Bovik et al. | |
| 5,337,085 A | 8/1994 | Lee et al. | |
| 5,444,800 A | 8/1995 | Kim | |
| 5,533,138 A | 7/1996 | Kim et al. | |
| 5,687,256 A | 11/1997 | Kimura et al. | |
| 5,844,614 A | 12/1998 | Chong et al. | |
| 6,266,817 B1 | 7/2001 | Chaddha | |
| 2004/0213349 A1 | 10/2004 | Zador et al. | |
| 2005/0131660 A1 | 6/2005 | Yadegar et al. | |

FOREIGN PATENT DOCUMENTS

WO 2007129840 A1 11/2007

OTHER PUBLICATIONS

Cockshott, W. et al., "Image Enhancement Using Vector Quantisation Based Interpolation," Proceedings of the British Machine Conference, Sep. 2007, 10 pages.
Hang, H. et al., "Interpolative Vector Quantization of Color Images," IEEE Transactions on Communications, vol. 36, No. 4, Apr. 1988, 6 pages.
Tsang, P. et al., "Small Codebook Interpolative Vector Quantization System," International Symposium on Signal Processing and its Applications, Aug. 1996, 4 pages.
Wu, F. et al., "Image Compression by Visual Pattern Vector Quantization (VPVQ)," Data Compression Conference, Mar. 2008, 9 pages.

*Primary Examiner* — Aaron W Carter
(74) *Attorney, Agent, or Firm* — Carole Boelitz; Micky Minhas

(57) ABSTRACT

The restoration of images by vector quantization utilizing visual patterns is disclosed. One disclosed embodiment comprises restoring detail in a transition region of an unrestored image, by first identifying the transition region and forming blurred visual pattern blocks. These blurred visual pattern blocks are compared to a pre-trained codebook, and a corresponding high-quality visual pattern blocks is obtained. The high-quality visual pattern block is then blended with the unrestored image to form a restored image.

12 Claims, 5 Drawing Sheets

IMAGE RESTORATION BY VECTOR QUANTIZATION UTILIZING VISUAL PATTERNS

CROSS-REFERENCE TO RELATED APPLICATIONS

This application is a divisional of U.S. patent application Ser. No. 12/194,552, titled IMAGE RESTORATION BY VECTOR QUANTIZATION UTILIZING VISUAL PATTERNS and filed Aug. 20, 2008, the entire disclosure of which is hereby incorporated by reference.

BACKGROUND

Image compression allows the downsizing of an electronic image for more compact transmission or storage. Image compression may be lossless or lossy. Lossless compression allows for the image to be fully reconstructed after compression so that the reconstructed image is identical to the original image, whereas lossy compression results in a reconstructed image that is not identical to the original image.

One advantage of lossy compression is that it may create a smaller compressed file than lossless compression. However, a disadvantage of lossy compression may be a loss of detail in the resulting decompressed image, particularly details in the contour and edge regions of the image.

One approach to lossy compression is known as vector quantization, and involves mapping image data to a set of scalar indices, thereby allowing the quantization of an input file by reducing a set of input vectors to a smaller set of output indices. A vector quantization encoder partitions a group of vectors into codewords that correspond to indices in a codebook, and transmits those indices to the decoder. The decoder then references the codebook and extracts the data that corresponds to the received indices, which allows the reconstruction of the image, with some lost information due to the quantization process.

A variation on vector quantization called interpolative vector quantization (IVQ) introduces dimension reduction such that the codebook in the encoder is learned on down-sampled vectors and the codebook in the decoder on high-dimension vectors. Further, in some implementations, IVQ may be utilized with a codebook learned by the decoder. This may allow the decompression of images compressed by a variety of encoders, as the decoder may operates independently from the encoder with respect to the codebook used.

SUMMARY

Various embodiments related to the restoration of transition regions of an image using vector quantization are disclosed herein. For example, one disclosed embodiment comprises a method of restoring detail in a transition region of an unrestored image using vector quantization. First, a transition region in the unrestored image and a blurred visual pattern block associated with the transition region are identified. Next, a codeword corresponding to the blurred visual pattern block is identified in a codebook and a corresponding high-quality visual pattern block is determined. Lastly, the image is reconstructed by blending the high-quality visual pattern block with the unrestored image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
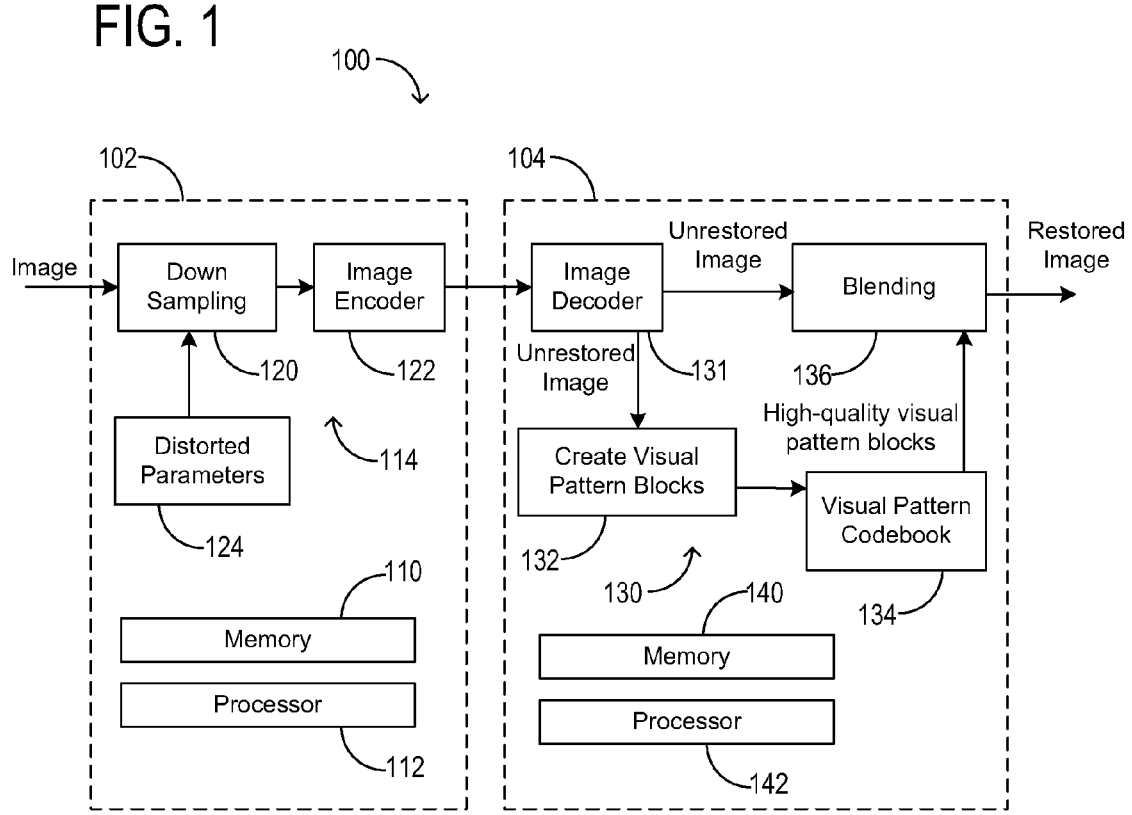
FIG. 1 shows an embodiment of a system for compressing and decompressing an image that restores detail in a transition region of an unrestored image using visual pattern vector quantization.

FIG. 1 shows embodiment of a system 100 for compressing and decompressing an image. As depicted, an image is compressed on the first computing device 102 and transmitted to another computing device 104 for decoding, for example over a network link. However, other embodiments may have the encoder and decoder components on a single computing device.

System 100 comprises a first computing device 102 and second device 104. First computing device 102 comprises computer-readable media, such as memory 110, and a processor 112, wherein the memory 110 stores instructions executable by processor 112 to run an encoder 114 configured to encode image data. The encoder 114 comprises a downsampling module 120 and an image compression module 122. Thus, the encoder 114 may comprise two levels of lossy compression, namely a down-sampling process that reduces the resolution of an image to create a downsampled image comprised of fewer pixels, and a lossy compression process, such as JPEG, JPEG 2000, etc., which further compresses the downsampled image. Although the compression modules may yield an image that is smaller and easier to transmit, lossy compression introduces distortion parameters 124 causing the reconstructed image to be different from the original image. Moreover, this distortion may affect edge and contour regions of the image. In other embodiments, either downsampling or lossy compression may be omitted, or more than two lossy steps may be performed.

Likewise, computing device 104 comprises instructions stored on computer-readable media, such as memory 140, that are executable by processor 142 to run a visual pattern vector quantization (VPVQ) decoder 130 configured to recover detail lost due to distortion introduced in the encoding process. VPVQ decoder 130 comprises an image decoder module 131, a visual pattern block creation module 132, a visual pattern codebook 134, and a blending module 136. Decoder module 131 up-samples the image to its original resolution. At this point the image is said to be "unrestored" in that it has been upsampled to its original resolution, but is not identical to the original image because of the distortion introduced during encoding. Visual pattern block creation module 132 identifies transition regions comprising edge regions or contour regions of the image, and creates blurred visual pattern blocks containing edge pixels extracted from the transition regions of the unrestored image. VPVQ decoder 130 then uses visual pattern codebook 134, which contains paired codewords corresponding to pairs of blurred visual pattern blocks and their high-quality counterparts, to identify high-quality visual pattern blocks that correspond to the blurred visual pattern blocks. Lastly, VPVQ decoder 130 uses blending module 136 to blend the high-quality visual pattern blocks obtained from visual pattern codebook 134 with the unrestored image. These steps are discussed in more detail below.

A visual pattern block as contemplated herein comprises a block of pixels located at a transition region of an image, such as an edge or contour region of the image. A blurred visual pattern block is a visual pattern block in the unrestored image, and a high-quality visual pattern block is a visual pattern block in the high quality image from which the blurred image is derived. As opposed to the division of an entire image into "image blocks" to train a codebook and to encode/decode an image, the training of a codebook and encoding/decoding of an image using visual pattern blocks comprises utilizing blocks of pixels that are a part of a "visual pattern" in the image that contains information not only regarding intensities in the image, but also geometric edge information. A "visual pattern" may be thought of as a representation that characterizes variations in a block of pixels located at a transition region in an image (e.g. a primal patch, as contemplated by primal sketch theory) without taking the magnitude of intensity into account. A visual pattern may be generated by removing a low-frequency part of an image at a transition region of an image that contains large intensity variation. The formation of visual pattern blocks is described in more detail below.

The utilization of visual pattern blocks may allow an image restoration process to focus on transition regions of the image rather than an entire image. Unlike flat, low frequency regions in an image that may suffer few effects during lossy compression, transition regions may be considerably affected by lossy compression. Therefore, one benefit of the visual pattern block approach is that it may focus the restoration process on those regions which may be most distorted by compression. Furthermore, this may allow the use of a codebook comprising codewords corresponding to visual patterns, rather than one comprising codewords corresponding to image blocks, which may improve decoder performance at transition regions. Additionally, such a codebook may be learned by the decoder, potentially allowing a decoder to be used with images encoded by different encoders.

Figure 2:
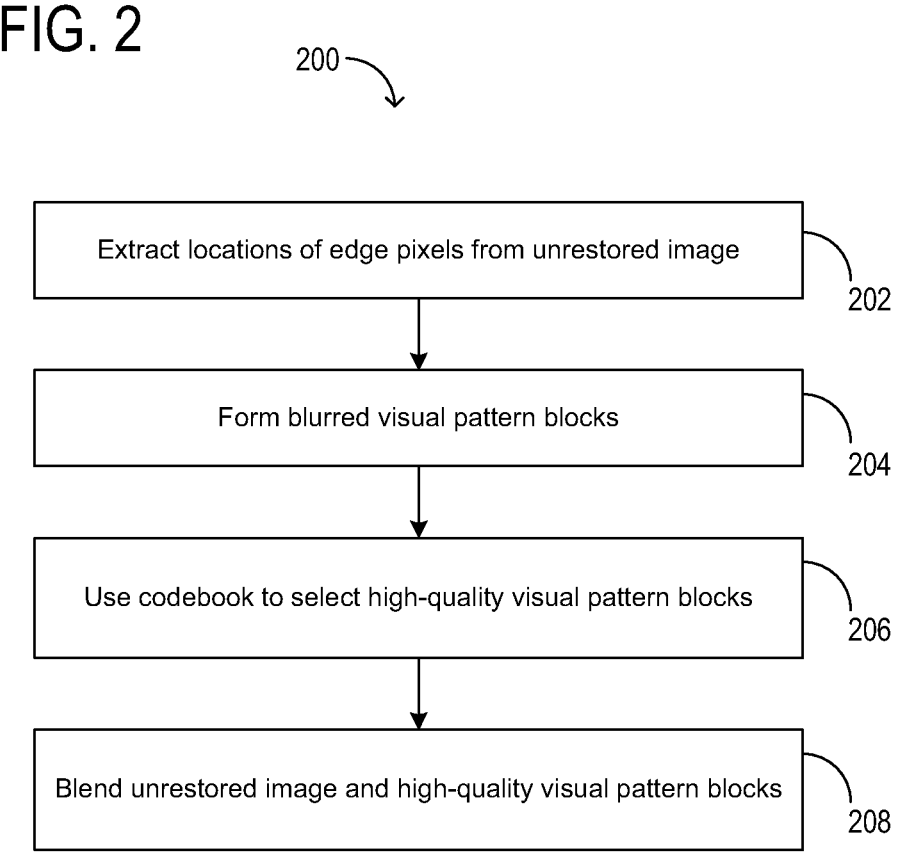
FIG. 2 shows a process flow depicting an embodiment of a method of restoring detail in a transition region of an unrestored image using visual pattern vector quantization.

FIG. 2 shows an embodiment of method 200 for restoring detail in a transition region of an image via VPVQ. Method 200 may be performed on any unrestored image that has been lossily compressed or downsampled. However, method 200 may find particular applicability where the downsampling or compression used for the unrestored image is similar to or the same as that used to train the VPVQ codebook. Method 200 first comprises, at 202, extracting locations of the edge pixels in the image. This may be done in any suitable manner, including but not limited to applying directional filters to detect edge pixels and/or applying a high-pass filter to filter out low frequency components of the unrestored image.

Continuing with FIG. 2, method 200 next comprises, at 204, forming visual pattern blocks associated with the transition regions in the unrestored image. Each visual pattern block is formed by selecting an edge pixel and identifying a set of pixels adjacent to the edge pixel. In some embodiments, the edge pixel may be the central pixel in the visual pattern block, while in other embodiments, the edge pixel may have another location within the visual pattern block.

Continuing with FIG. 2, method 200 at 206 comprises receiving the blurred visual pattern block and referencing the pre-trained visual pattern codebook to select a corresponding high-quality visual pattern block. The structure of the codebook is discussed in further detail in the description of FIG. 3, and the training of the codebook is discussed in further detail in the description of FIG. 4. Lastly, method 200 at 208 comprises blending with the unrestored image the high-quality visual pattern block obtained via the codebook.

Method 200 may be implemented in any suitable manner. One embodiment of a more detailed implementation is shown as method 300 in FIG. 3. Method 300 is described in the context of restoring an unrestored image. An unrestored image, as described above, is an image that has distortion introduced by a previous processing step.

Distortion may be introduced into an unrestored image in any of a number of manners, such as by downsampling or lossy compression. For the purposes of the following description, a generic distortion is described in terms of a group theoretic approach, as follows. An N-dimensional sampling lattice L is defined as a sub-lattice such that L is a subset of the integer domain of rank N. The generating matrix of the lattice L is a nonsingular N×N integer matrix G, such that an element t of the N-rank integer domain is mapped to Gt which is also an element of the N-rank integer domain. Thus, the map of any such t is exactly the lattice L. In two-dimensional cases, the matrix G can be written as a Hermitian upper triangular form. In other words, for the 2-D case matrix G is a square matrix with entries that are equal to their conjugate transposes, where all entries appear in or above the diagonal, $$G = \begin{bmatrix} G_1 & 0 \\ 0 & G_2 \end{bmatrix} \begin{bmatrix} a & b \\ 0 & c \end{bmatrix}.$$

Here $G_1$ and $G_2$ are positive real units in each dimension, respectively, and a, b, and c are integers with the following constraints: a, c are greater than or equal to one, and b is greater than zero and less than or equal to a. Once G is selected, the generic down-sampling and filtering transforms the original high-resolution signal x[t] and yields the down-sampled signal $\hat{x}[Gt]$ according to $$\hat{x}[Gt] = \sum_{t \in L_0} x[t] h_1[Gt - t], \text{ for } Gt \in L_1.$$

This assumes the lattice $L_1$ is the sub-lattice of $L_0$, where G is the generating matrix taking $L_0$ to $L_1$. The down-sampling filter with limited support is represented by $H_1$, where $H_1$ is a set of elements $h_1[\bullet]$. Likewise a corresponding process exists for up-sampling the down-sampled signal $\hat{x}[Gt]$, $$\tilde{x}[t] = \sum_{Gt \in L_1} \hat{x}[Gt] h_2[t - Gt].$$

Here, the down-sampling filter with limited support is represented by $H_2$, where $H_2$ is a set of elements $h_2[\bullet]$. The resulting up-sampled signal is represented by $\tilde{x}[t]$. The down-sampling filter and sampling matrix introduced distortion parameters, such that the up-sampled signal $\tilde{x}[t]$ is not identical to the original signal x[t]. Furthermore, the down-sampling and up-sampling processes may not affect flat regions of the input image in terms of visual quality but salient regions around edges and contours may be blurred significantly.

Returning to method 300, method 300 begins at 302 by identifying a transition region in the unrestored image. This may be performed in any suitable manner, including but not limited to applying a high-pass filter to the unrestored image to identify high frequency components of the image. Next, method 300, at 304, comprises extracting the locations of the edge pixels. This may be done in any of a variety of methods, including but not limited to applying directional filters.

Having obtained the locations of the edge pixels residing in the transition regions of the image, method 300, at 306, next comprises defining a blurred visual pattern block that includes an edge pixel. As discussed above, a visual pattern block is a block of pixels located at a transition region of an image and that contains an edge pixel. A visual pattern block may be identified in any suitable manner One such approach is described as follows. This approach is described both for determining a high-quality visual pattern block from a high-quality image and for a blurred visual pattern block from an unrestored image. However, it will be understood that the high-quality visual pattern block is generally derived during a codebook training process, while the blurred visual pattern block is derived both during an image restoration process and during codebook training. An example codebook training process is explained in more detail below.

In one embodiment, the determination of a high-quality visual pattern block begins by first calculating a residual signal, which may be defined as a difference between the high-quality image and the upsampled, unrestored image produced therefrom due to a distortion process. The residual signal is then scaled by a scaling parameter, yielding a normalized signal. The high-quality visual pattern block is then extracted from the normalized signal.

Mathematically such an approach for extracting high-quality visual pattern blocks may be described as follows, where x[t] represents the high-quality signal and x̃[t] represents the up-sampled signal. To form the residual signal, r[t], the difference in the high-quality signal and the up-sampled signal is calculated, $$r[t] = x[t] - \tilde{x}[t].$$

Thus, the residual signal corresponds to the distortion introduced during the compression and sampling processes. A scaling parameter s[t] is defined, $$s[t] = \sum_{k \in W_1} |r[k] h_3[t-k]|,$$

where the normalized low-pass filter is represented by $H_3$, where $H_3$ is a set of elements $h_3[\bullet]$, and $W_1$ is a window. The normalized signal p[t] can now be defined as a scaled residual signal, $$p[t] = \frac{r[t]}{s[t]}.$$

The edge pixels $\{e_i\}$, i=1, ..., M are extracted from x̃'[t], the decoded version of the up-sampled signal. The high-quality visual pattern block P is then extracted from p[t] by, $$P = \{p[t] | t \in B, t_0 \in B, t_0 \in \{e_i\}\}.$$

Here, B is a N×N block and $t_0$ is the center of the block. In other words, the central pixel of a visual pattern block may be an edge pixel.

Likewise, the blurred visual pattern block P' defined at 306 in method 300 may be extracted in a similar manner as described for the high-quality visual pattern block, except that the residual signal is calculated differently. In this case the residual signal r'[t] may be calculated from the decoded up-sampled signal x̃'[t] as follows, $$r'[t] = \tilde{x}'[t] - \sum_{k \in W_2} \tilde{x}'[k] h_4[t-k],$$

where the low-pass filter is represented by $H_4$, with $H_4$ being a set of elements $h_4[\bullet]$, and $W_2$ is a window. Note that this equation describes high-pass filtering.

Figure 3:
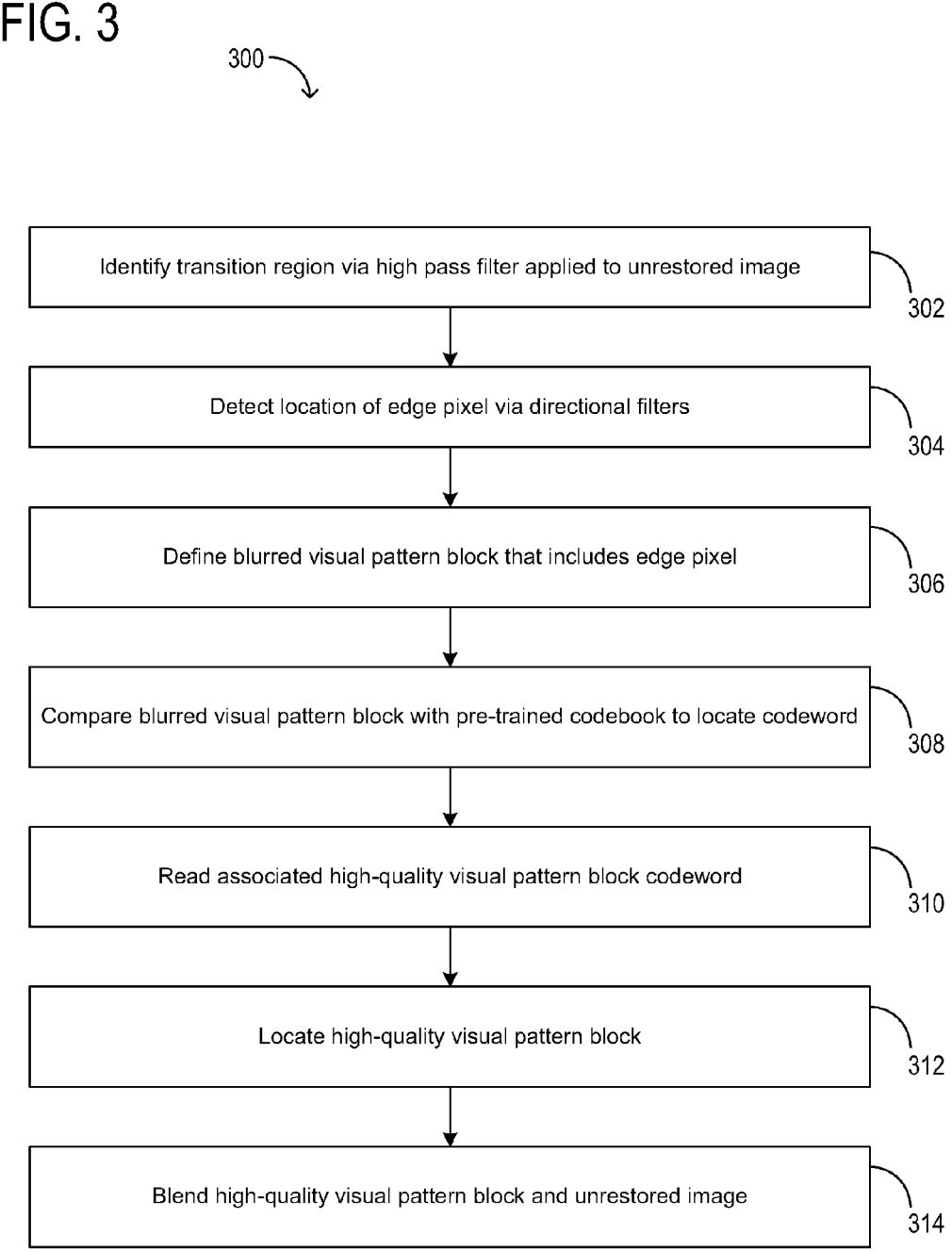
FIG. 3 shows a process flow depicting another embodiment of a method of restoring detail in a transition region of an unrestored image using visual pattern vector quantization.

Continuing with FIG. 3, method 300, at 308, next comprises determining a blurred visual pattern block codeword in a pre-trained visual pattern codebook that is associated with the blurred visual pattern block. The pre-trained visual pattern codebook comprises pairs of associated codewords, with each pair $\{C_k, C'_k\}$ comprising a blurred visual pattern block codeword $C'_k$ (and the corresponding high-quality visual pattern block codeword $C_k$.

The codebook may be designed in any suitable manner. One example of a suitable method for designing the codebook is as follows. Such an approach is based on optimizing the partition cells of the high-quality visual pattern blocks by minimizing a distortion term given below, and then applying these partition cells to the blurred visual pattern blocks. Let $\{P_i, P'_i\}$, i=1, ..., M, be a sequence of high-quality visual pattern blocks and blurred visual pattern blocks, respectively. The distortion is defined as $$D_{vq} = \sum_{k=1}^{K} \sum_{allPi \in Sk} \|P_i - C_k\| p(P_i)$$

where it is assumed that all $P_i$ are mapped to one of K output vectors $C_k$, and $S_k$ denotes the k-th partition cell. Here, $\|\bullet\|$ is the Euclidian or $l_2$ norm and p( ) is the joint probability mass function of $P_i$. The high-quality visual pattern codeword $C_k$ is calculated by the nearest neighbor principle, $$C_k = P_i, s.t. \min_{P_i \in S_k} \sum_{all\ P_j \in S_k} \|P_j \in P_i\|.$$

Once the partition cells are decided, they are applied to the blurred visual pattern blocks $P'_i$ and the codewords $C'_k$ corresponding to $P'_i$ are calculated, $$C'_k = P'_i, \text{if } C_k = P_i.$$

Therefore each item in the codebook is a pair $\{C_k, C'_k\}$.

Returning to FIG. 3, method 300, at 308, comprises locating in the pre-trained codebook a blurred visual pattern block codeword, $C'_k$, that is associated with the blurred visual pattern block. The blurred visual pattern codeword may be determined in any suitable manner For example, in one embodiment, for each blurred visual pattern block the location k in the codebook may be found by minimizing $$\min_k \|P' - C'_k\|.$$

Continuing with FIG. 3, method 300, at 310, comprises using the blurred visual pattern block codeword yielded at 308 to read an associated high-quality visual pattern block codeword from the pre-trained codebook. Following the methodology of the codebook design described above, the codebook comprises pairs of associated codewords, with each pair {$C_k$, $C'_k$} comprising a blurred visual pattern block codeword $C'_k$ and the corresponding high-quality visual pattern block codeword $C_k$. Thus at 310, $C_k$ is read from the pair containing the received blurred visual pattern block codeword $C'_k$.

Next, method 300, at 312, comprises obtaining the high-quality visual pattern block corresponding to the high-quality visual pattern block codeword.

Continuing with FIG. 3, method 300, at 314, next comprises blending the high-quality visual pattern block with the unrestored image. One non-limiting example of an approach to the reconstruction blending is as follows. The final reconstruction of the restored image may be described as:

$$x[t] = \tilde{x}'[t] + \tilde{r}'[t].$$

Here $\tilde{x}'[t]$ is the decoded up-sampled signal and $\tilde{r}'[t]$ is the visual pattern information calculated using the received high-quality visual pattern blocks, $$\tilde{r}'[t] = \alpha \sum_{all\ C_k[t]} C_k[t] s'[t].$$

In such an approach, one pixel may be enhanced by multiple high-quality visual pattern blocks. $C_k[t]$ means that the retrieved visual pattern blocks cover the location t. s'[t] is the scaling information calculated from r'[t]. $\alpha$ is an empirical constant introduced to compensate an energy difference between s'[t] and s[t].

Figure 4:
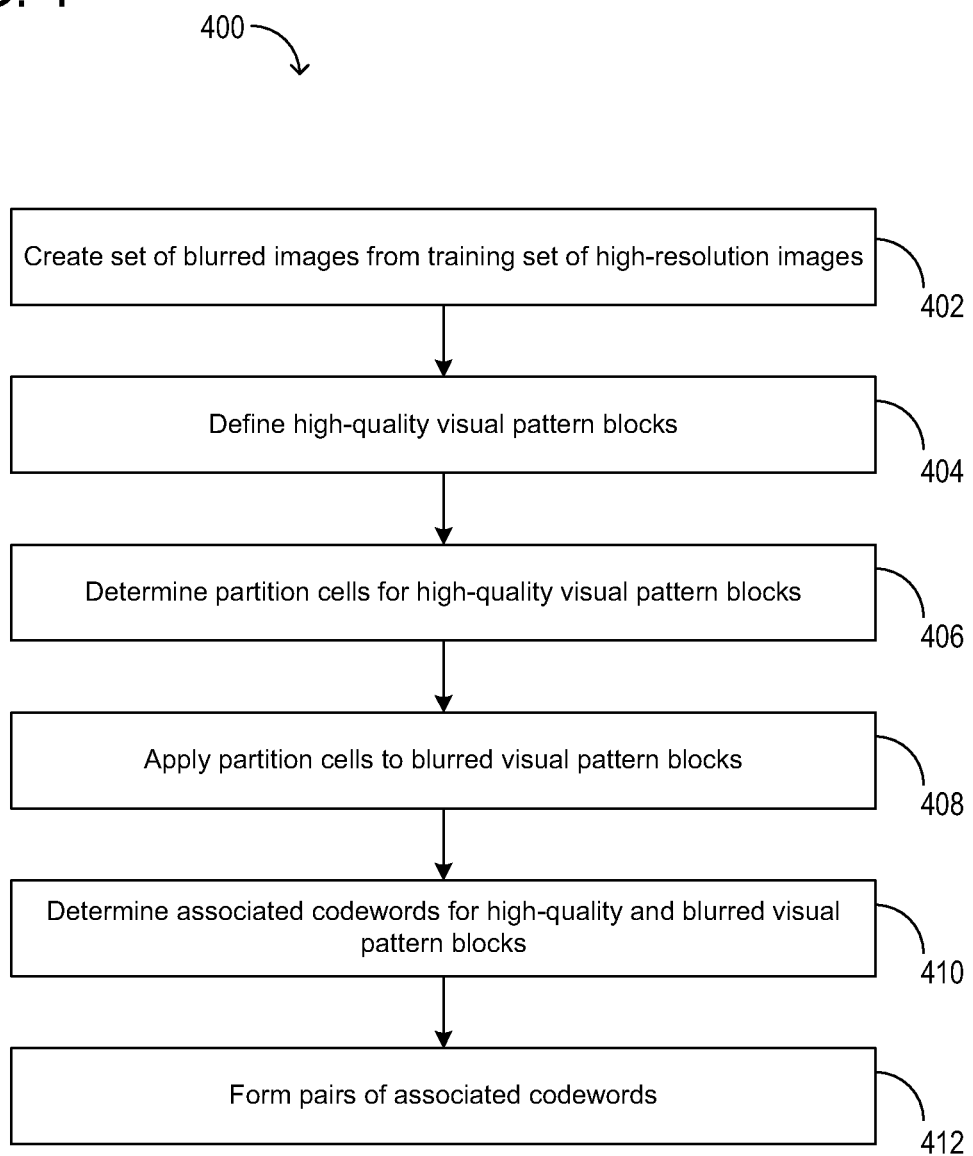
FIG. 4 shows a process flow depicting a method of training a visual pattern vector quantization codebook.

The pre-trained codebook may be trained in any suitable manner. FIG. 4 shows an embodiment of a suitable method 400 for training the codebook. It will be noted that the pre-trained codebook described herein may be learned by the decoder. This may reduce an amount of information transmitted by the encoder, and potentially may allow a decoder to be used to restore images encoded by different encoders (as the encoder does not reference the codebook during encoding, and therefore does not need access to a codebook used by the encoder, if any).

Method 400, at 402, begins with a set of high-resolution training images. Any suitable image or image set may be used to train the codebook. It will be appreciated that trained with a set of training images containing richer visual patterns may offer advantages over a codebook trained with less-rich visual patterns.

Continuing with FIG. 4, method 400, at 402, comprises creating a set of blurred images from the training set of high-resolution images. The blurred images may be created in any suitable manner, including but not limited to down-sampling and then up-sampling the images to introduce distortion into the image.

Method 400, at 404, next comprises defining high-quality visual pattern blocks in the transition regions of the high-quality images. The high-quality visual pattern blocks may be defined in any suitable manner, including but not limited to the approach described in the above discussion of FIG. 3. In such an approach, the transition regions and edge pixel locations in the corresponding blurred image are identified by applying directional and high-pass filters. The high-quality visual pattern block is then formed by taking an edge pixel and identifying a set of pixels adjacent to the edge pixel.

Method 400, at 406, then comprises defining blurred visual pattern blocks in the transition regions of the blurred images. The blurred visual pattern blocks may be defined in any suitable manner, including but not limited to the manner discussed above for FIG. 3. In such an approach, the transition regions and edge pixel locations in the blurred image are identified by applying directional and high-pass filters, and a blurred visual pattern block is formed by taking an edge pixel and identifying a set of pixels adjacent to the edge pixel. In some embodiments, the blurred visual pattern blocks are not compressed in the training process so as to avoid quantization distortion in the codebook, although such distortion may exist in the decoding process.

Continuing with FIG. 4, method 400, at 406, next comprises determining the partition cells for the high-quality visual pattern blocks. Many approaches may exist for determining the partition cells, and one such approach is described herein. Such an approach is designed on optimizing the partition cells of the high-quality visual pattern blocks by minimizing the distortion, as discussed above with reference to FIG. 3.

Method 400, at 408, comprises applying the partition cells determined at 406 to the blurred visual pattern blocks. Next, at 410 the codewords for the high-quality and blurred visual pattern blocks are determined. The high-quality visual pattern block codewords and the blurred visual pattern block codewords may be defined in any suitable manner, including but not limited to the manner discussed above for FIG. 3.

Continuing with FIG. 4, method 400, at 412, comprises forming pairs of associated codewords to complete the codebook. Each pair of codewords {$C_k$, $C'_k$} comprises a blurred visual pattern block codeword $C'_k$ and the associated high-quality visual pattern block codeword $C_k$. In this manner, the codebook may be used to identify a high-quality visual pattern block that corresponds to a blurred visual pattern block extracted from an unrestored image.

Figure 5:
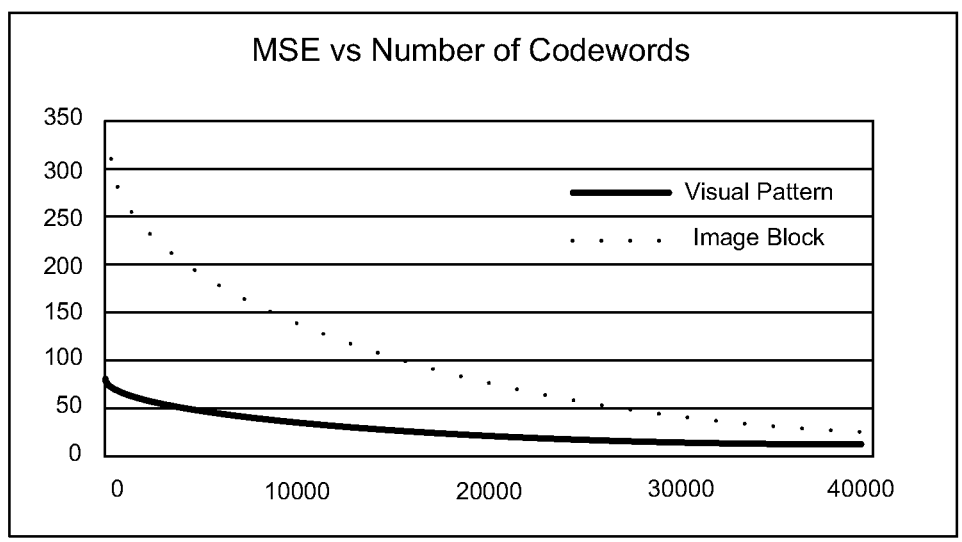
FIG. 5 shows a graph comparing a mean squared error (MSE) of an embodiment of a visual pattern block vector quantization decoding compared to an image block decoding method of a sample image.

FIG. 5 shows experimental results in the form of a graph 500 comparing a mean squared error (MSE) of an embodiment of a visual pattern block vector quantization decoding compared to an image block decoding method. This data demonstrates a clustering behavior of visual pattern blocks compared to a clustering behavior of image blocks during a clustering process that may be used for codebook training. For the comparison, data sets for each of the aforementioned methods are generated, and input into a clustering method. The clustering method chosen for this comparison is an enhanced version of the Linde, Buzo, Grey (ELBG) clustering method. Such a clustering method uses the concept of utility of a codeword to facilitate a choice of the initial codebook, and is further discussed in the paper by G. Patane and M. Russo, "The enhanced LBG algorithm" in Neural Networks, vol. 14, pp 1219-1237, 2001.

The visual pattern data set used in the comparison comprises 82567 pairs of visual pattern blocks extracted from two images of a training set. The image block data set used in the comparison comprises blocks extracted according to the same edge information directly from the original images in the manner of traditional interpolative vector quantization. Both sets of data are input to the ELBG method over a range of different numbers of codewords, and the MSE of each method is calculated for each number of codewords used. The vertical axis of the graph shown in FIG. 5 is the MSE, and the horizontal axis is the number of codewords. From FIG. 5, it can be seen that the MSE of the visual pattern vector quantization codewords is consistently lower than the MSE of the image block codewords. Such a comparison may demonstrate that for the same input vectors and codewords, visual pattern blocks form clusters more readily than image blocks.

In another experiment, a comparison of an embodiment of a visual pattern block vector quantization decoding method and a JPEG compression method was examined in terms of visual quality and peak signal-to-noise ratio (PSNR). The former method comprised an image of size 512×512 being down-sampled 3:1 in each dimension and compressed by JPEG at 1.665 bpp. Since the down-sampled image is only one-ninth of the original number of pixels, such a down-sampling followed by JPEG compression is comparable in terms of rate to compressing the original image at 0.185 bpp. Next, the edges were extracted from the decoded and up-sampled image, forming 16710 visual pattern blocks, and then the image was reconstructed. The reconstructed image yielded by such a method was then compared to an image produced via a JPEG compression method wherein the input image was compressed at 0.185 bpp.

Comparison of the resulting images from each of these approaches demonstrates that although the bit-rate is low for the visual pattern method, the visual quality is good and its PSNR is approximately 29.92 dB. In contrast, the image directly compressed by the JPEG method had block artifacts and a PSNR is 28.24 dB. Thus the visual pattern method yielded fewer block artifacts and a higher PSNR than JPEG despite the small bit rate.

While vector quantization using visual patterns is described herein in the context of the depicted embodiments, it will be appreciated that the configurations and/or approaches described herein are exemplary in nature, and that these specific embodiments or examples are not to be considered in a limiting sense, because numerous variations are possible. The specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device comprising memory and instructions stored in memory and executable by the computing device to perform a method of training a codebook, the method comprising:
for a training set of images comprising a high-resolution image, creating a blurred image that is lower in resolution than the high resolution image;
detecting a location of an edge pixel in the transition region of the blurred image;
defining a blurred visual pattern block that includes the edge pixel in the blurred image;
defining a high-resolution visual pattern block in the high-resolution image corresponding to the edge pixel in the blurred image;
determining a high-quality visual pattern block codeword corresponding to the high-resolution visual pattern block;
determining a blurred visual pattern block codeword corresponding to the high quality visual pattern codeword; and
forming a pair of two codewords comprising the high-quality visual pattern block codeword and the blurred visual pattern block codeword.

2. The computing device of claim 1, wherein the training set comprises a plurality of high-resolution images.

3. The computing device of claim 1, wherein the instructions are executable to use the codebook to restore detail in a transition region of an unrestored image.

4. The computing device of claim 1, wherein the instructions are executable to identify a blurred visual pattern block associated with the transition region, compare a blurred visual pattern block to the codebook, locate via a codeword a high-quality visual pattern block that corresponds to the blurred visual pattern block, and blend the high-quality visual pattern block with the unrestored image.

5. On a computing device, a method of training a codebook, the method comprising:
for a training set of images comprising a high-resolution image, creating a blurred image that is lower in resolution than the high resolution image;
detecting a location of an edge pixel in the transition region of the blurred image;
defining a blurred visual pattern block that includes the edge pixel in the blurred image;
defining a high-resolution visual pattern block in the high-resolution image corresponding to the edge pixel in the blurred image;
determining a high-quality visual pattern block codeword corresponding to the high-resolution visual pattern block;
determining a blurred visual pattern block codeword corresponding to the high quality visual pattern codeword; and
forming a pair of two codewords comprising the high-quality visual pattern block codeword and the blurred visual pattern block codeword.

6. The method of claim 5, wherein the training set comprises a plurality of high-resolution images.

7. The method of claim 5, further comprising using the codebook to restore detail in a transition region of an unrestored image.

8. The method of claim 5, further comprising identifying a blurred visual pattern block associated with the transition region, comparing a blurred visual pattern block to the codebook, locating via a codeword a high-quality visual pattern block that corresponds to the blurred visual pattern block, and blending the high-quality visual pattern block with the unrestored image.

9. A computer readable storage device comprising stored instructions executable by a computing device to:
for a training set of images comprising a high-resolution image, create a blurred image that is lower in resolution than the high resolution image;
detect a location of an edge pixel in the transition region of the blurred image;
define a blurred visual pattern block that includes the edge pixel in the blurred image;
define a high-resolution visual pattern block in the high-resolution image corresponding to the edge pixel in the blurred image;

determine a high-quality visual pattern block codeword corresponding to the high-resolution visual pattern block;

determine a blurred visual pattern block codeword corresponding to the high quality visual pattern codeword; and form a pair of two codewords comprising the high-quality visual pattern block codeword and the blurred visual pattern block codeword.

10. The storage device of claim 9, wherein the training set comprises a plurality of high-resolution images.

11. The storage device of claim 9, wherein the instructions are executable to use the codebook to restore detail in a transition region of an unrestored image.

12. The storage device of claim 9, wherein the instructions are executable to identify a blurred visual pattern block associated with the transition region, compare a blurred visual pattern block to the codebook, locate via a codeword a high-quality visual pattern block that corresponds to the blurred visual pattern block, and blend the high-quality visual pattern block with the unrestored image.

\* \* \* \* \*